United States Patent [19]

Fierstein et al.

[11] Patent Number: 5,223,891
[45] Date of Patent: Jun. 29, 1993

[54] PRODUCTION OF SECOND-GENERATION CAMERA-ORIGINAL CONTROL TOOL PHOTOGRAPHIES VIA PHOTOGRAPHY OF DIGITALLY-GENERATED TRANSPARENCY OF AN ORIGINAL SCENE

[75] Inventors: William E. Fierstein, Rochester, N.Y.; William C. Kress, Andover, Mass.; Gary S. Castelluzzo, Rochester, N.Y.

[73] Assignee: Eastman Kodak Company, Rochester, N.Y.

[21] Appl. No.: 664,151

[22] Filed: Mar. 4, 1991

[51] Int. Cl.$^5$ .......................................... G03B 27/32
[52] U.S. Cl. ...................................... 355/77; 355/133
[58] Field of Search ................. 355/38, 40, 41, 77; 364/525, 526; 358/76, 80

[56] References Cited

U.S. PATENT DOCUMENTS

5,001,512  3/1991  Kubota .......................... 355/77 X
5,083,152  1/1992  Tokuda .......................... 355/38 X Primary Examiner—Russell E. Adams
Assistant Examiner—D. Rutledge
Attorney, Agent, or Firm—Edward Dugas

[57] ABSTRACT

A method of predictably producing accurate photoprocessing reference image tool photographs to be used for adjusting the parameters of photographic devices, in which a first-generation camera-original image of a scene containing preselected background and subject content is photographed onto a first photographic recording medium. A second first-generation camera-original image of charts containing photoprocessing parameter control information is photographed under the same conditions as the first exposure, onto a second photographic recording medium. The first image is photodigitized into a first digitized image which is stored in a primary digital image data metric in a digital image data base. One or more parameters of the first digitized image are selectively adjusted. Photoprocessing control element(s) (e.g., calibration patch(es)), whose characteristics are derived from analysis of the second first-generation camera-original image of the charts, is digitally inserted onto the first digitized image to produce a composite digital image. The composite digital image is selectively adjusted and digitally recorded onto a photographic recording medium via a digital output recording device. The composite image that has been recorded, as a transparency, on the photographic recording medium is backlit and photographed. Photographs taken of the composite image transparency obtained are then developed to provide second-generation camera-original photoprocessing control tool photographs whose frequency response, tone and color characteristics are indistinguishable from those of a first-generation camera-original photograph on the same film type.

15 Claims, 8 Drawing Sheets

FIG. 1

FIG. 3A
STAGE II

FIG. 3B
STAGE II (CONT.)

FIG. 3C

FIG. 4B
STAGE III (CONT.)

PRODUCTION OF SECOND-GENERATION CAMERA-ORIGINAL CONTROL TOOL PHOTOGRAPHIES VIA PHOTOGRAPHY OF DIGITALLY-GENERATED TRANSPARENCY OF AN ORIGINAL SCENE

FIELD OF THE INVENTION

The present invention relates in general to photofinishing systems and is particularly directed to a process for repetitively producing consistent, accurate photofinishing control tools for calibrating or otherwise adjusting film processing and reproduction equipment, via the photography of digitally-generated images.

BACKGROUND OF THE INVENTION

Photofinishers customarily employ one or more quality control tools, typically in the form of calibrated first-generation camera-original negatives that contain reference portrait images, to make comparison measurements or observations in order to "fine tune" the operation and performance of various pieces of photofinishing equipment. (These calibrated camera-original negatives have come to be referred to as "Shirleys", named after the model photographed during the initial production many years ago).

Because of the contents of these camera-original reference negatives must be specified to extremely high standards, the process conventionally employed to produce them is expensive, labor intensive and time consuming. Factors which contribute to the arduous task of producing each camera-original negative include that the model and professional photographer must be available for an extended period of time (on the order of weeks to sometimes months). Associated with the use of a live model is the need for the continued services of a scene stylist in order to ensure the photogenic quality of the portraits. In this regard it should be noted that it is substantially impossible for even the most professional of models to maintain the same facial expression and body attitude (even with the assist of ergonometric devices) for the hundreds of exposures that make up a typical one of repeated photographic sessions. As a consequence, cosmetic and postural non-uniformities can be expected to occur in any given batch of product control tool negatives produced using current methods.

Unforeseen circumstances may also arise wherein the model originally chosen may become unavailable at some point prior to the completion of the production of the required number of product negatives, in which case a different model may have to be substituted. This substitution of one model for another also adversely affects the cosmetic uniformity of the product control tool negatives.

Additional factors encountered using the conventional method result in sensitometric non-uniformities in the product control tool negatives. These factors include, but are not limited to, the fact that the studio lighting used in the photography of the live model is complex, employing sidelights, keylights, gelatin color filters, etc., all of which are subject to performance variations, especially considering the extended time frame to produce large quantities of product negatives.

For the purpose of clarity throughout this document, definitions of the following terms as they will be used throughout this discussion are given below.

The term "negative" will refer to a camera exposure onto a film type from which photographic paper prints are normally produced.

Generally speaking, the photographic terms "positive" and "transparency" are interchangeable. For the sake of clarity, in this discussion the term "positive" will be reserved to mean a camera-original exposure onto a reversal film type, from which photographic paper prints are not normally produced, but which are usually viewed via projection.

The term "transparency", will be reserved to mean, specifically, that positive image which is digitally-generated onto a reversal photographic film type, or other non-photographic (e.g. thermal) medium, using a digital output recording device, and which is intended to be backlit and photographed to produce "second-generation camera-original" exposures (defined below), whether onto a negative or positive (i.e., reversal) film type.

The term "first-generation camera-original" will refer to a photographic exposure that is created in the usual manner, using a conventional camera to photograph a live scene. This camera exposure may be photographed onto either a negative or a positive film type.

The term "second-generation camera-original" will refer to a photographic exposure that is created using the method embodied within the present invention wherein a transparency produced by a digital output recording device is backlit and photographed using a conventional camera. As with a first-generation camera-original exposure, a second-generation camera-original exposure may also be photographed onto either a negative or a positive film type.

The term "primary film type" will refer to that film type onto which first-generation camera-original photographs that are intended to be photodigitized and sensitometric exposures that are intended to be photodigitized are exposed.

The term "product film type" will refer to that film type onto which second-generation camera-original product control tool photographs of a backlit digitally-generated transparency and first-generation camera-original verification photographs are exposed.

Since both first-generation and second-generation camera-original exposures may be produced on either a negative or positive film type, the term "photograph" will be used to avoid the cumbersome phrase "negative (or positive)" throughout the document.

The term "primary metric" will be used as an abbreviation for the more cumbersome phrase "primary digital image data metric."

The term "target metric" will be used as an abbreviation for the more cumbersome phrase "secondary, target digital image data metric."

The term "develop" will refer to the photochemical processing of an exposure, whether the exposure was created via a camera, a sensitometer or a digital output recording device.

The term "Color Chart" will refer to a physical chart comprised of approximately one hundred samples, possibly of paper, corresponding to various colors encountered in real life.

The term "Neutral Scale Chart", abbreviated as (NSC), will refer to a physical chart comprised of approximately fifty samples of spectrally non-selective (i.e., neutral) materials, possibly of paper, of discrete lightness/darkness values.

SUMMARY OF THE INVENTION

In accordance with the present invention, the above enumerated drawbacks of a conventional photofinishing control tool production scheme are obviated by using digital image processing techniques to obtain a base image in the form of a calibrated digitally-generated transparency of a scene which may be backlit and repeatedly photographed onto a product film type to predictably obtain precision-quality, second-generation camera-original photographs whose frequency response, tone and color characteristics are indistinguishable from first-generation camera-original photographs exposed onto that same product film type at a live scene.

Pursuant to the process carried out by the present invention, an image of a scene that contains preselected background and subject content (e.g., a professional model seated in front of a studio portrait background) is photographed in the conventional manner onto a primary film type. A separate image of photoprocessing parameter control information, such as a set of preselected calibration charts, is photographed onto the primary film type at the same time and under the same lighting conditions as the live model. In addition, predefined sensitometric exposures are produced, on the primary film type that was used to photograph the model. All of these exposures on the primary film type are developed together, so that each exposure will have been subjected to the same photoprocessing conditions.

The developed first-generation camera-original photograph (containing the model and background) is electronically photodigitized. The resulting density-representative output signals are converted into digital format and stored in a "primary" digital image data metric in a digital image data base.

Selected photoprocessing control elements, typically in the form of calibration and identification patches that will be used by the photofinisher, are then digitally inserted into the primary metric version of the image to produce a composite digital image.

A digital data transform is derived and employed to convert the primary metric version of the composite image to a secondary "target" digital image data metric version of the composite image which is, in turn, provided as input to a high spatial resolution digital film output recording device. This digital output recording device produces a digitally-generated transparency which may be backlit and repeatedly photographed onto a product film type to predictably obtain precision-quality, second-generation camera-original photographs, on the product film type, whose frequency response, tone and color characteristics are indistinguishable from first-generation camera-original photographs exposed on that same product film type at a live scene.

The digitally-generated transparency is backlit and photographed onto the desired product film type using a conventional camera, thereby producing second-generation camera-original photographs of the original scene. These second-generation photographs are chemically developed, yielding the desired photoprocessing reference image tool.

In addition to the improvement in cosmetic and sensitometric uniformity resulting from the use of the current invention, a particularly important improvement in the accuracy of the photoprocessing control elements contained within the product control tool photographs also results.

Since the first-generation camera-original photograph of the live model and the first-generation camera-original photograph of the charts containing photoprocessing control information (e.g., the Color Chart and the Neutral Scale Chart) are both photodigitized, the present invention makes possible accurate digital sampling of the densities recorded on the first-generation photographs of specific areas within each scene (e.g., a model's face, or the 18% grey patch found within the Neutral Scale Chart that is photographed with the live scene). This, in turn, permits repeatably accurate reproduction of those sampled density values in the photoprocessing control elements that are digitally inserted into the digitally-generated transparency. Accurate reproduction of these values in the second-generation product control tool photographs via photography of the backlit transparency ensues.

In the prior art it was only possible to approximate these important values in the product first-generation camera-original control tool photographs by including in the live scene "nearly spectrally non-selective" and/or "nearly flesh-colored" cardboard cards. The precision gained using the method of the present invention, via the photodigitization and subsequent digital sampling of specific densities resulting from the photography of actual flesh tones and actual patches of known spectral reflectance values is an advantage of the present invention.

Other objects, advantages and novel features of the present invention will become apparent from the following detailed description of the invention when considered in conjunction with the accompanying drawings.

DETAILED DESCRIPTION OF A PREFERRED EMBODIMENT

Prior to describing the process of the invention, the apparatus used for carrying out this process is briefly described below. The use of the apparatus in carrying out the steps of the process will be provided in more detail in the description of the process.

Figure 1:
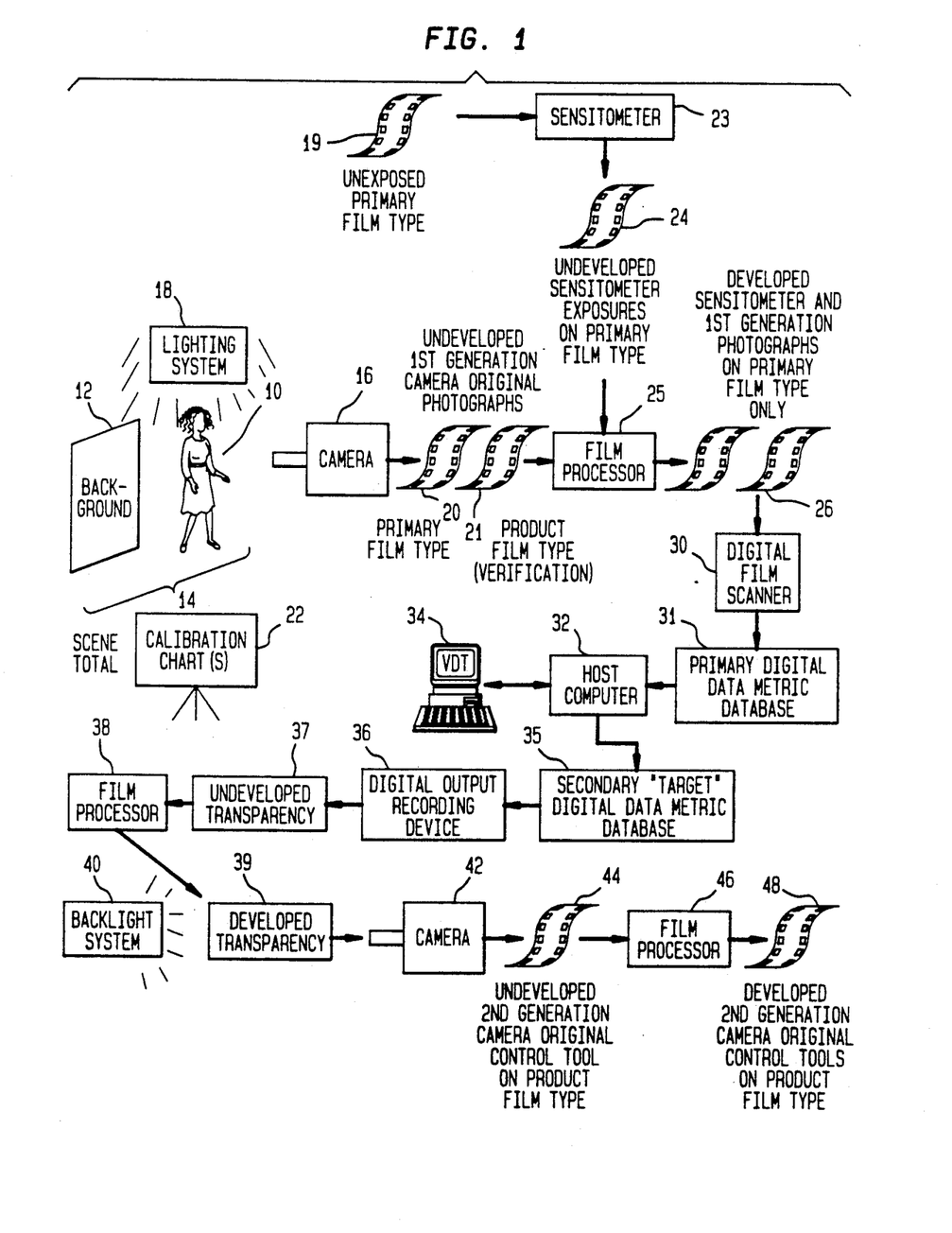
FIG. 1 shows an apparatus in accordance with an embodiment of the present invention for the production of second-generation camera-original control tool photographs via photography of digitally-generated calibrated transparencies of an original scene.

FIG. 1 shows a diagrammatic illustration of the apparatus used to carry out the process according to a preferred embodiment of the present invention. The production of a "Shirley" photofinishing reference tool via the present invention is begun by photographing a professional model against a background, in a photographic studio environment, in the same manner as that used in the prior art. (It should be recognized, however, that the process described below is applicable to any scene, and is not limited to a "Shirley.") As illustrated in FIG. 1, a professional model 10 is positioned in front of the background 12 and the scene total 14, containing the model and the background, is photographed using a conventional camera 16, on a primary film type 20.

The lighting of scene 14 is established, in the conventional manner, by controlling foreground and background illumination by means of a lighting system 18. Unlike the method used in the prior art, the model need not sit through days and days of repeated camera exposures. Instead, with scene conditions properly established, the number of times required for the model to be photographed will depend upon only two factors:

a) Each product film type on which it is intended that second-generation camera-original control tool photographs are to be produced requires that a small number (e.g., 5–10) of conventional first-generation camera-original photographs be produced on that product film type at the live scene. These first-generation photographs on the product film type 21 serve a verification function to be described later.

b) Since it is intended that the second-generation camera-original control tool photographs be produced on the product film type as a "set" of under-exposed, normally-exposed and over-exposed images, it is also necessary to expose conventional, first-generation camera-original photographs on the product film type at each of these exposure levels. These first-generation photographs on the product film type will also serve a verification function, and are also represented as item 21 in FIG. 1.

In addition to photographing the live model 10 and studio background 12, comprising the scene total 14, a separate image of photoprocessing parameter control information, such as preselected calibration chart(s) (e.g., the Color Chart and the Neutral Scale Chart) 22, is photographed at the same time and under the same lighting conditions as the scene total 14. The film used for the purpose of photographing the chart(s) 22 is the sam primary film type 20 as that used to photograph the scene total 14.

Separate predefined analytical exposures 24 are also produced, using an exposing device such as a sensitometer 23, on the same primary film type 19 as that used to photograph the scene of the model and background. Since each of these separate photographic and sensitometric exposures on the primary film type is used in the determination of the tone and color characteristics of the developed first-generation camera-original photograph 26, it is necessary that each of these exposures be subjected to the same photoprocessing conditions. Accordingly, all of the sensitometric and first-generation camera-original exposures on the primary film type 20 and 24 are developed together, in film processor 25 in the conventional manner. The first-generation camera-original verification photographs exposed on the product film type 21 are not developed at this time.

The developed first-generation camera-original photograph on the primary film type 26, containing the model and background, is photodigitized and stored in a primary digital image data metric in a digital image data base 31 as is the developed sensitometric exposure (also 26). For this purpose the developed first-generation camera-original photograph and sensitometric exposure 26 may be scanned by a commercially available high resolution optoelectronic digital film scanner 30, such as a Perkin Elmer PDS Microdensitometer or an Eikonix Model 1435 high resolution scanner. Each of these photodigitizing film scanners has a very high resolution sensor pixel array (e.g. 3072×2048 pixel matrix) capable of generating high spatial density-representative output signals which, when converted into digital format, yield digitized photographic image files from which high quality color reproductions may be obtained using a digital output recording device 36.

For each scanned image, digital film scanner 30 outputs, in a primary digital image data metric, digitally-encoded data that are representative of the opto-electronic response of the digital film scanner's high resolution imaging sensor pixel array to the film density modulation recorded on the first-generation camera-original film photograph. The primary metric version of the scanned image is stored in a database 31 and coupled to a host digital image processor (host computer) 32.

This digitally encoded data, or digitized image, is supplied in the form of imaging pixel array-representative bit maps, resolved to a prescribed code width (e.g. eight bits per pixel for each of the Red, Green and Blue color channels), to host computer 32. Host computer 32 contains an image encoding and storage operator through which each digitized image file is stored. Host computer 32 is interfaced with a video display terminal (VDT) 34 or workstation through which digitized image files may be controllably called up for display to the operator user in the course of customizing the digital version of the Shirley image.

The control mechanism that drives the video display terminal 34 may contain a simplified or edited version of bit map manipulation software, such as that supplied by a computer graphics vendor, which provides the operator user with the ability to access menu-driven image manipulation functions, such as the addition of text to the image, zoom, crop, and tone and color corrections. Non-limitative examples of readily coded image processing algorithms that may be used for this purpose include those described in the published literature, such as "Digital Image Processing" by William K. Pratt, in particular, Chapters 4, 12 and 16, respectively entitled "Image Sampling and Reconstructions," "Image Enhancement" and "Luminance, Color, and Spectral Image Restoration," 1978 John Wiley and Sons, ISBN 0-471-01888-0; and "Digital Image Processing" by Rafael C. Gonzalez, in particular, Chapter 4, entitled "Image Enhancement," 1983 Addison-Wesley Publishing Company, Inc. ISBN 0-201-02596-5. Many such image processing algorithms have been implemented as commercially available packages. Their encoding schemes are optimized for performance and are commercially available as libraries of subroutines, such as MathPAK 87 (trademark of Precision Plus Software). Additional image processing software that may be used includes Photoshop (trademark of Adobe Systems Incorporated), ColorStudio (trademark of Letraset) and PhotoMac (trademark of Avalon Development Group).

Digital images from the host computer 32 are digitally reproduced, after digital data transformation from the primary metric 31 to the target digital image metric 35, by way of a high spatial resolution digital recording device 36, such as a MacDonald-Dettweiler Associates Fire 1000 film recorder, as a positive transparency 37, onto a reversal film such as Kodak EKTACHROME 100 film. The positive transparency 37 is developed in film processor 38 in the conventional manner. The developed positive transparency 39 is backlit using backlighting system 40 and photographed onto the product film type 44 using a conventional camera 42. The photograph 44 is developed in the conventional manner in film processor 46, producing a second-generation camera-original photograph 48 of the original scene on the product film type. The frequency response, tone and color characteristics of the second-generation camera-original photograph are designed to be indistinguishable from those characteristics of the verification first-generation camera-original photograph 21 of the scene exposed onto the product film type, after that verification photograph is, itself, developed in the conventional manner.

Figure 2:
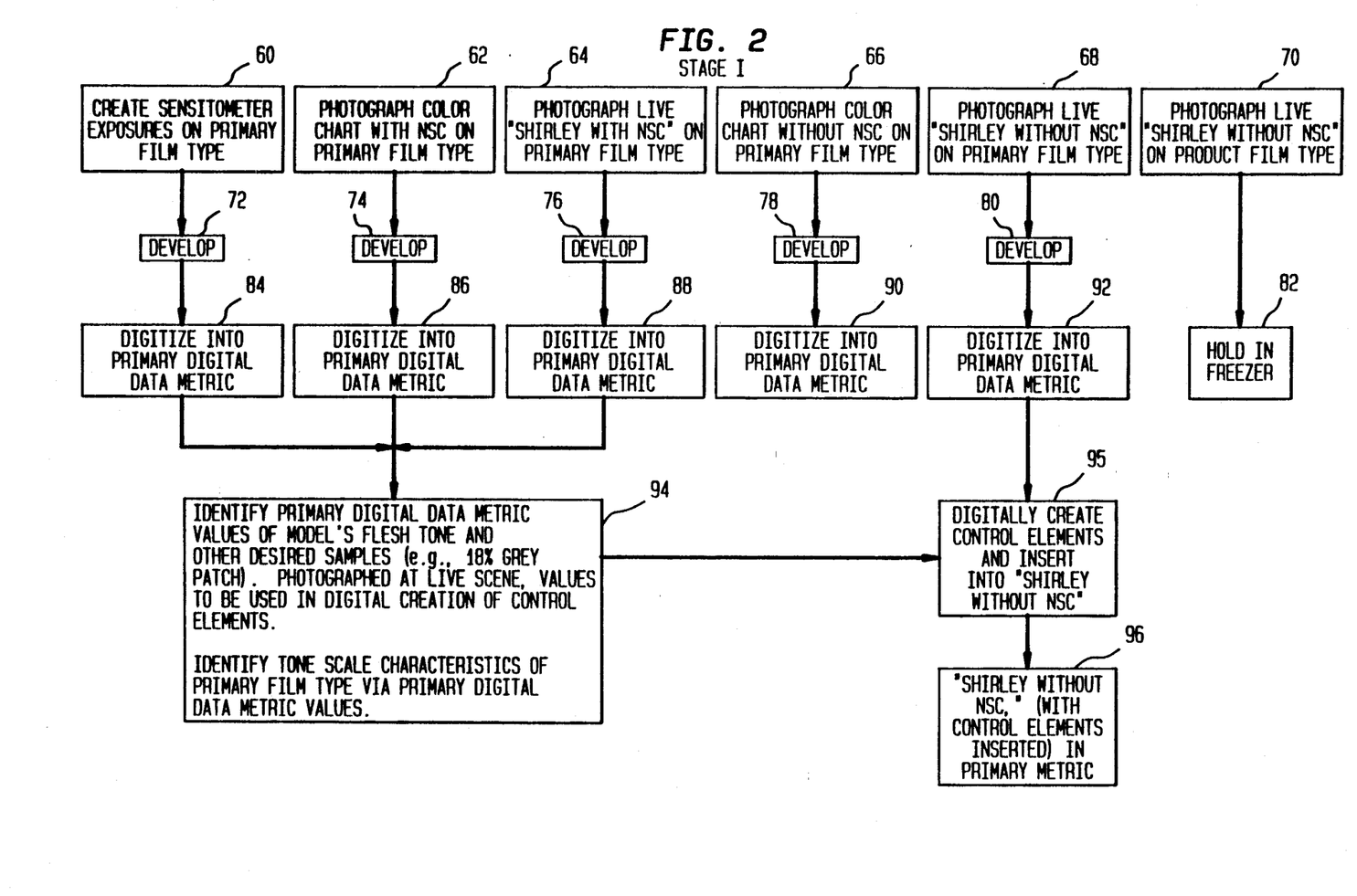
FIG. 2 shows the first stage of the process according to an embodiment of the present invention.
Figure 3A:
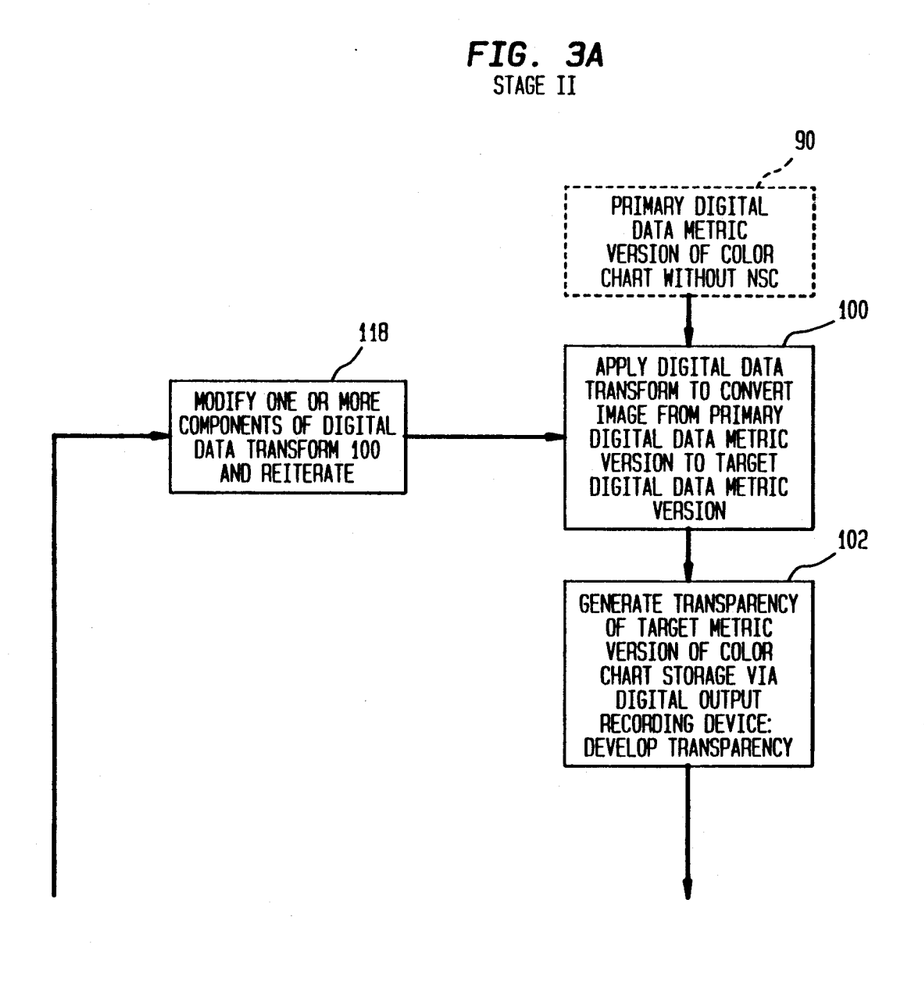
FIGS. 3a and 3b show the second stage of the process according to an embodiment of the present invention.
Figure 3B:
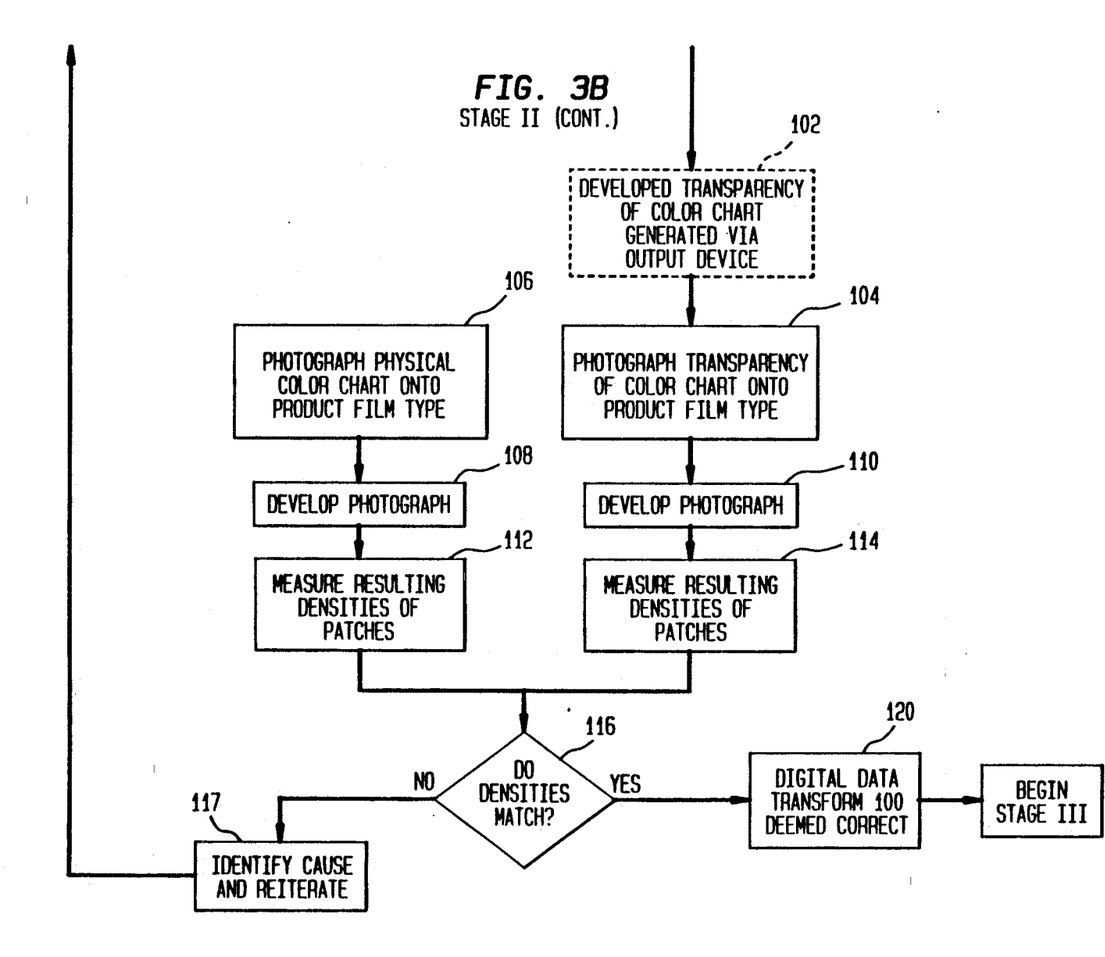
Figure 3C:
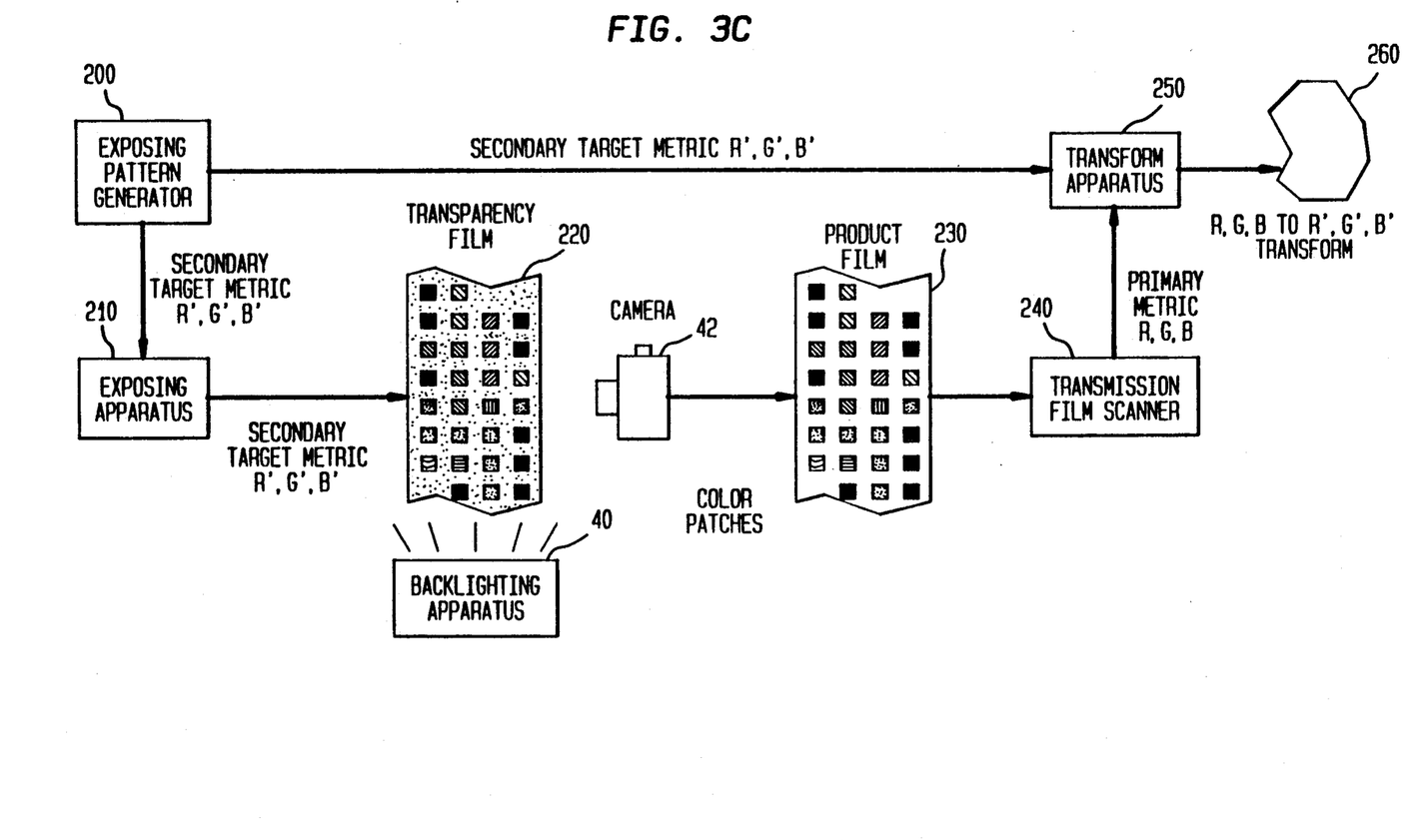
FIG. 3c shows the second stage of the process according to another embodiment of the present invention.
Figure 4A:
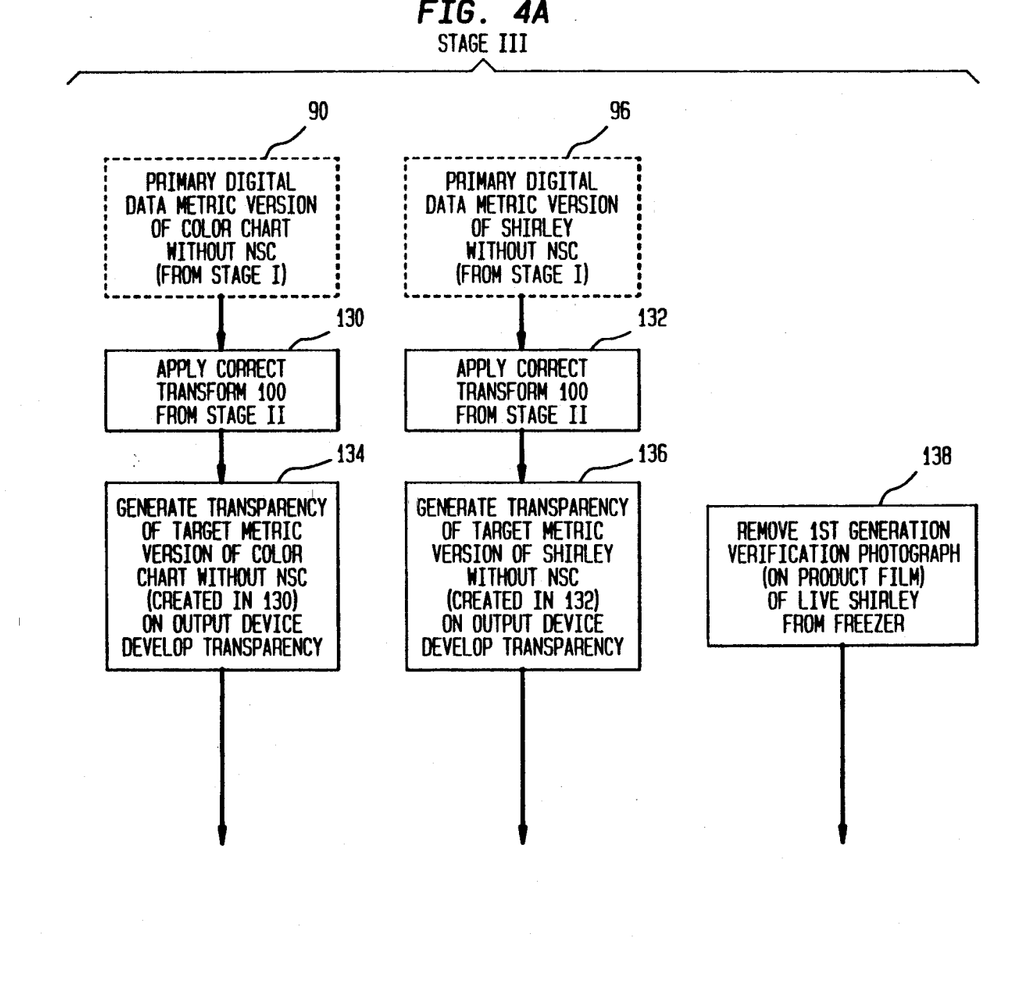
FIGS. 4a, 4b and 4c show the third stage of the process according to an embodiment of the present invention.
Figure 4B:
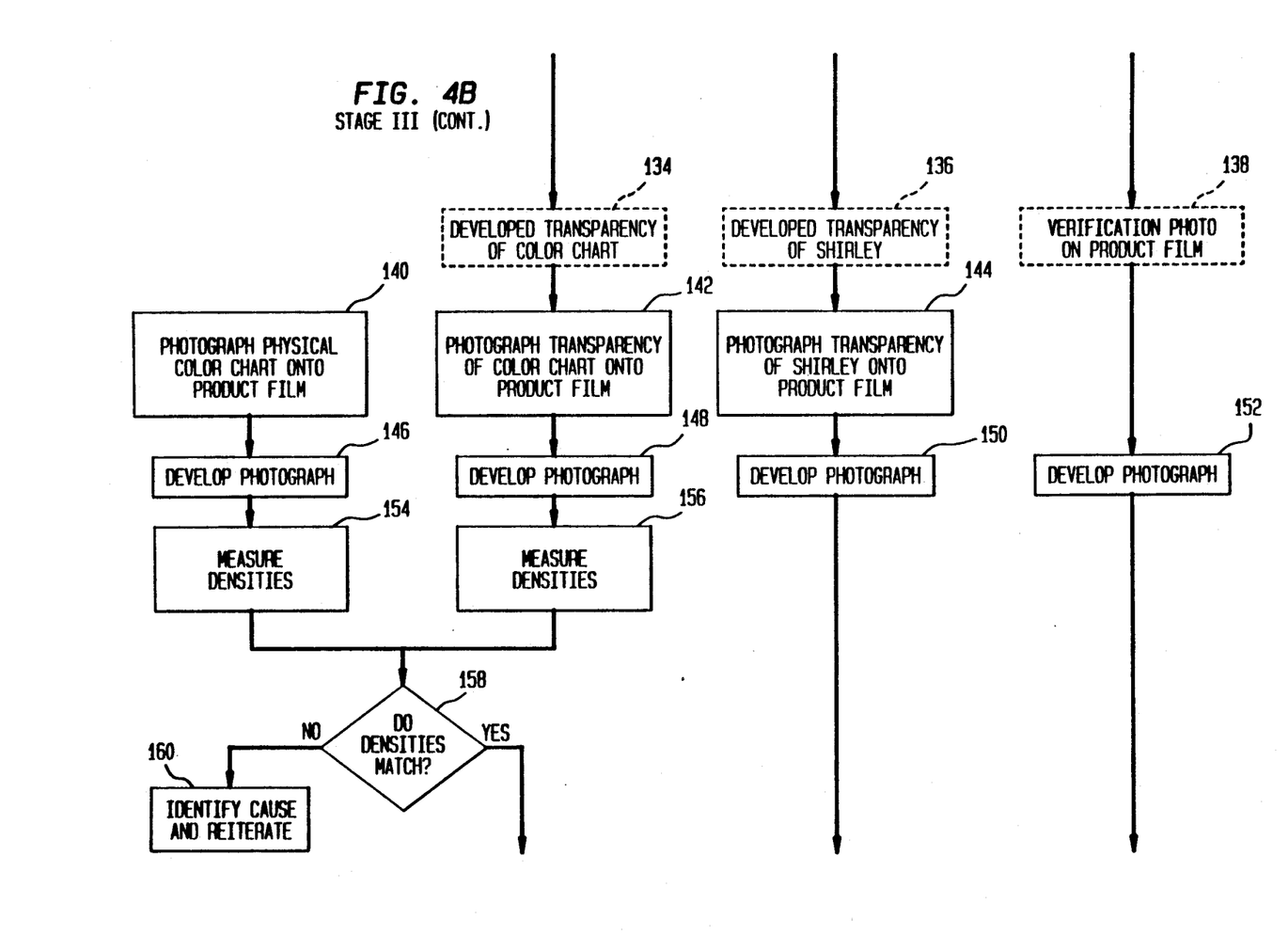
Figure 4C:
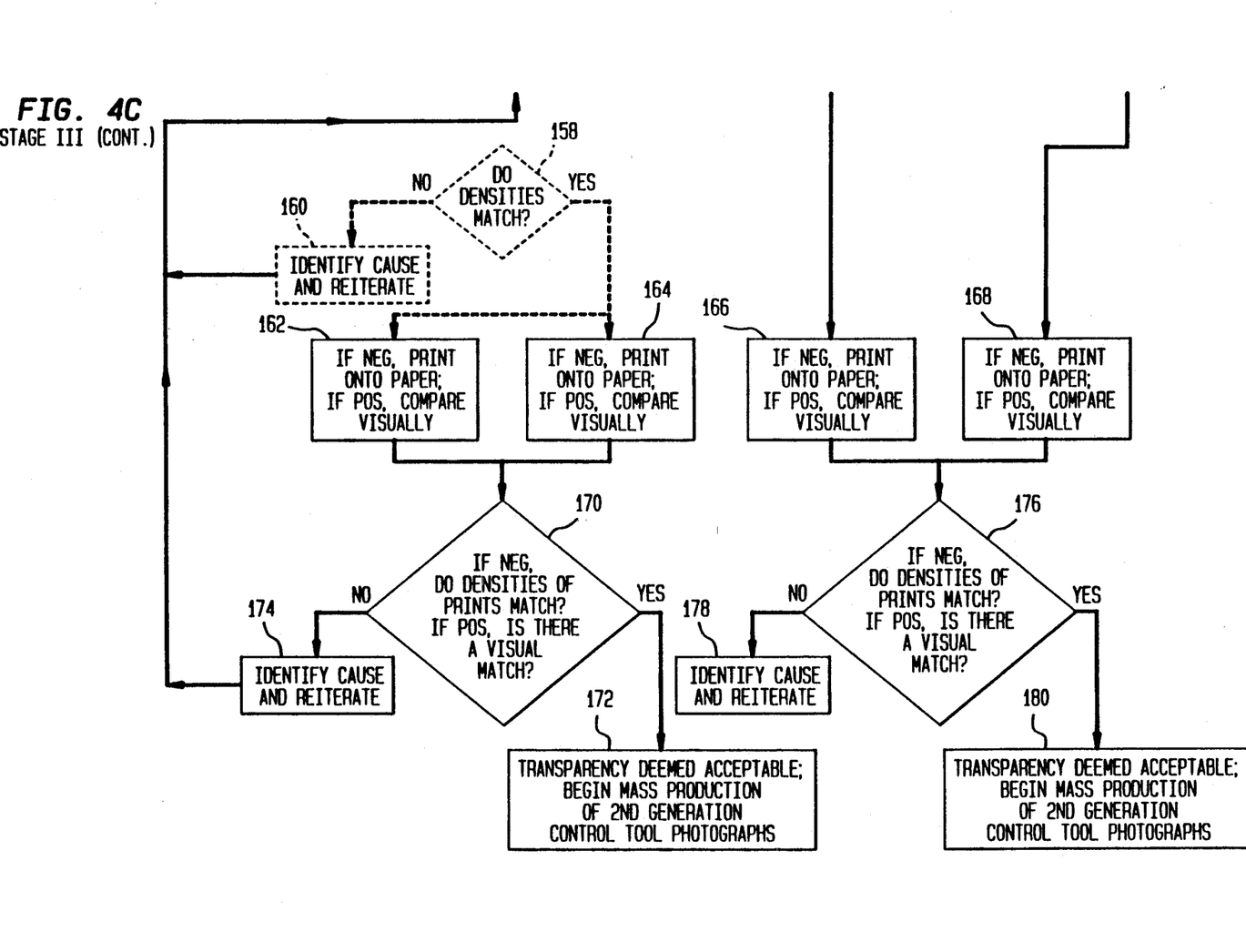

The process of the invention can be considered to comprise three stages. A preferred embodiment of Stage I is shown in FIG. 2. A preferred embodiment of Stage II is shown in FIGS. 3a and 3b, while a second embodiment of Stage II is shown in FIG. 3c. A preferred embodiment of Stage III is shown in FIGS. 4a, 4b and 4c.

In Stage I, the original live scene and physical charts are photographed, developed and photodigitized, resulting in images stored in a primary metric.

Step 60 relates to the off-line creation of sensitometric exposures, on the primary film type, of known exposure values using a sensitometer.

Steps 62 through 70 relate to first-generation camera-original photography using the conventional optical camera 16. Exposures 62 through 68 are made on the primary film type. Exposure 70 is made on the product film type for verification purposes.

In a preferred embodiment of the present invention, the Color Chart may be composed of approximately one hundred samples, which may be papers, of various hues, corresponding to colors normally encountered in real life. The Neutral Scale Chart (NSC) may be composed of approximately fifty samples of spectrally non-selective (i.e., neutral) materials, which may be papers, of discrete lightness/darkness values. The papers used in the preferred embodiment are referred to as Munsell (trademark of Kollmorgen Corp.) papers.

In a preferred embodiment the spectral reflectance values of each of the patches of Munsell papers comprising both the Color Chart and the Neutral Scale Chart, are measured and documented.

It is necessary to determine the tone scale characteristics of each scene, as recorded by the primary film type used in the exposing of the first-generation camera-original photographs of that scene. This determination may be accomplished via the insertion of the Neutral Scale Chart into each scene, as shown in steps 62 and 64 of FIG. 2. However, because the inclusion of the Neutral Scale Chart is not desired in the final product second-generation camera-original control tool photographs, each scene must also be photographed, on the primary film type, without the Neutral Scale Chart being included in the scene, as shown in steps 66 and 68 of FIG. 2. Hereafter, these two versions of each scene will be referred to as "Shirley with NSC" and "Shirley without NSC" or "Color Chart with NSC" and "Color Chart without NSC."

Step 62 portrays the photography, on the primary film type, of the "Color Chart with NSC" scene under the same lighting conditions 18 as the scene 14 containing the live model. (As practiced in a preferred embodiment of the present invention, the charts 22 are simply substituted for the live model 10 after the photographs of the live model have been made. This ensures that the charts are photographed under the same lighting conditions, and in the same physical location, as the live model).

The photograph of the "Color Chart with NSC", on the primary film type, and its subsequent digitization into the primary metric, serves as a tool whose use permits the derivation of the digital data transform required to convert digital images stored in the primary metric to digital images stored in a target metric. Its use also permits the evaluation of the accuracy of the color rendition of the product second-generation camera-original control tool photographs.

The "Color Chart with NSC" scene is photographed onto the primary film type in step 62. The "Shirley with NSC" scene is photographed onto the primary film type in step 64.

The "Color Chart without NSC" scene is photographed onto the primary film type in step 66. The "Shirley without NSC" scene is photographed onto the primary film type in step 68.

Finally, in step 70, the live Shirley is photographed a third time, and again without the NSC, but this time onto the product film type (as opposed to the primary film type). Since this step 70 exposure is a first-generation camera-original exposure of the live Shirley model, onto the same product film type as the second-generation camera-original control tool photographs that are to be produced, it will serve, in the verification stage, as the benchmark against which the fidelity of the second generation camera-original control tool photographs will be judged.

In steps 72–80, the photographic and sensitometric exposures produced on the primary film type in steps 60–68 are developed, simultaneously, in the film processor 25. The verification photograph 70 that was exposed onto the product film type at the live scene is not developed at this time, but is retained, undeveloped, for use in a later verification step. Since latent images recorded onto photographic films, as a rule, undergo various forms of physical change (referred to as "Latent Image Keeping" effects between the time the film is exposed and the time the film is developed, exposed film that is intended to be developed at a later date is normally stored in a refrigerator or freezer to minimize these effects. Such is the case with respect to the verification photograph on the product film type 70 in the preferred embodiment. This storage in the freezer is represented by step 82.

In steps 84–92, the developed primary film type photographs are photodigitized by the digital film scanner 30 in a manner familiar to those skilled in the art of digital imaging. The outputs of the photodigitizing scanner 30 are digitized versions of the scenes, stored in a primary metric database 31.

These primary metric versions of the images are coupled to the host computer 32 which will then perform subsequent digital image processing to convert those images to a secondary, target metric.

The tone scale characteristics of the particular film used as the primary film type in the first-generation camera-original photography are identified via analysis of the digital data derived from the photodigitization, into the primary metric, of the densities of the developed sensitometric exposures 84, and the densities of the Neutral Scale Chart patches in the developed first-generation photographs 86 and 88. (This tone scale information, may then be used in the derivation of the digital data transform to be described later).

In addition to identifying the primary metric values for the patches within the NSC, the primary metric values are also identified, from developed first-generation photographs 86 and 88, for the patches within the Color Chart and for the live model's flesh tone.

The primary metric values are used in the digital creation of control elements (i.e., calibration patches), requested by the client, that are digitally inserted into the primary metric version of the Shirley image 92. The identification of the tone scale of the primary film type and the determination of the correct digital values required for the control elements is illustrated in Step 94. The creation and insertion of the control elements is shown in step 95. Step 96 portrays the primary metric version of the Shirley image into which the control elements have been inserted.

This digital method of control element insertion results in a far greater degree of color accuracy and a far more cosmetically pleasing appearance than does the method, used in the prior art, of manually inserting "nearly spectrally non-selective" and/or "nearly flesh-colored" cardboard cards into the live scene during first-generation camera-original photography.

After the digital insertion of the calibration and identification control elements, this primary metric version of the "Shirley without NSC" image is held until the digital data transform that converts the primary metric to the target metric is deemed correct.

This concludes Stage I of the process according to the present invention.

A preferred embodiment of Stage II of the process of the current invention, shown in FIGS. 3a and 3b, relates to the development of a digital data transform, shown as step 100 in FIG. 3a, and to the calibration of the system by which the digitally-generated transparency and the second-generation camera-original control tool photographs are produced. Step 90 (from Stage I) is again pictured, as a dashed box, merely to show the connection between Stage I and Stage II.

The purpose of the digital data transform 100 is to convert the primary digital image data metric version of the images 90 and 96 to the secondary, target digital image data metric of the digital output recording device 36. The digital output recording device 36 is used to produce transparencies 39 which may be backlit and repeatedly photographed, using camera 42 to predictably obtain precision-quality, second-generation camera-original control tool photographs on the product film type 48 whose frequency response, tone and color characteristics are indistinguishable from those characteristics of first-generation camera-original verification photographs on the product film type 21 exposed at a live scene.

The components of transform 100 may include, but need not be limited to, particular one-dimensional mapping operations, multi-dimensional "look-up-tables" and/or matrix operators, the uses of which are familiar to those skilled in the art of digital image processing or other types of data-transforming operations. The derivation of the particular components of a transform that results in the production of a digitally-generated transparency, deemed to be in the target metric, and, hence, "calibrated" for a given product film type, may be based upon photographic iterations such as those described below.

The components of transform 100 may encompass several areas such as frequency response characteristics and tone and color characteristics.

In the present invention, a digital enhancement filter is included as a component of transform 100. The frequency response of the digital image may be enhanced via a digital filter to compensate for any degradation of frequency response that may occur when the digitally-generated transparency produced from that digital image is photographed. Use of such a filter produces a final product second-generation camera-original photograph on the product film type having the same spatial frequency response as a first-generation camera-original photograph on the same product film type. The degree to which the frequency response of the digitally-generated transparency is enhanced depends upon the optics of the conventional camera used to photograph the transparency as well as the frequency characteristics of the product film type on which the second-generation control tool photographs are being produced. Separate digital filters may be developed for each particular application of the second-generation camera-original technique. The creation and use of digital filters for the purpose of enhancing the frequency response of a photodigitized image originating on a particular type of film is understood by those with ordinary skill in the art of digital image processing.

With respect to the color characteristics of the digitally-generated transparency and, hence, the need for what has been referred to as a "target" metric produced via the application of transform 100, it must be noted that the goal of the present invention is to generate a transparency which, when backlit and photographed by the conventional camera onto the product film type, produces second-generation camera-original photographs on the product film type whose tone and color characteristics are indistinguishable from those characteristics of first-generation camera-original photographs exposed onto the same product film type at the live scene.

It is important to note that a transparency which is digitally-generated directly from the primary metric may not necessarily serve to produce accurate second-generation camera-original photographs on the product film type. A secondary target metric may need to be determined.

Those skilled in the photographic art will note that the densities formed on a developed photographic exposure 26 of a live scene 14, made in the conventional manner, depend upon the intensity and spectral characteristics of the lighting system 18 used to illuminate the live scene, the spectral reflectances of objects within the live scene, the spectral sensitivities of the film(s) 20 and 21 used in the photography of the live scene, the complex interlayer interactions in the film used in the photography of the live scene, the amount of exposure given to that film by the camera 16 (i.e., shutter speed and f/stop used) and the photochemical processing conditions in the film processor 25 encountered by the film during chemical development.

On the other hand, the densities formed on a developed photographic exposure 48 of a backlit transparency 39, as embodied in the present invention, depend upon the intensity and spectral characteristics of the lighting system 40 used to backlight the transparency 39, the spectral transmission characteristics of the imaging dyes that form the densities on the transparency, the spectral sensitivities of the product film 44 used in the photography of the transparency, the complex interlayer interactions in the product film used in the photography of the transparency, the amount of exposure given to the product film by the camera 42, (i.e., shutter speed and f/stop used) and the photochemical processing conditions in the film processor 46 encountered by the product film during chemical development.

As a result of the above, even though the same product film type that is used to photograph the digitally-generated transparency of the scene is also used, in the conventional manner, to photograph the original live scene, the densities formed on the second-generation photograph of the backlit transparency may not be the same as the densities formed on the first-generaton verification photograph of the live scene.

To produce a second-generation camera-original photograph, on the product film type, whose tone and color characteristics are indistinguishable from those of a first-generation camera-original photograph of the live scene on the same product film type, modifications may have to be made to one or more of the variables described above in reference to the production of the digitally-generated transparency.

The lighting system 40 used to backlight the transparency 39 is, in the preferred embodiment of the present invention, fixed. In that case, the densities resident in the digitally-generated transparency 39 may be modified in order to achieve the match described.

This modification of the densities formed in the digitally-generated transparency 39 is accomplished by converting the primary metric version of the image to a secondary, target metric version of the image, via a digital data transformation 100 which may include particular one-dimensional mapping operations, multi-dimensional "look-up-tables", matrix operators and/or other types of data-transforming operations, the uses of which are familiar to those skilled in the art of digital image processing.

Digital data in the target metric, which may result from application of data-transforming operations, provided to a particular digital output recording device 36, will produce a digitally-generated transparency 39 whose tone and color characteristics meet the criteria necessary for a second-generation camera-original photograph of that backlit transparency, on the product film type, to match a first-generation camera-original photograph of the live scene on that same product film type.

By creating, on the product film type, actual second-generation camera-original photographic exposures of a backlit, digitally-generated Color Chart transparency, the effects of the carious components of the second-generation system on the product film type can be evaluated and the entire second-generation system characterized.

Comparison of the densities produced on second-generation photographs, on the product film type, of a digitally-generated transparency of the Color Chart to the densities produced on the first-generation camera-original photographs, also on the product film type, of the physical Color Chart is a determining factor in deciding what, if any changes are required to the digital data transform 100.

The method by which transform 100 is derived, as performed by one preferred embodiment may be iterative in nature. This derivation begins with the generation, via the digital output recording device 36, of a transparency of the "Color Chart without NSC" image 90, using the version of the digital image stored in the primary metric as input to the digital output recording device. For the purpose of producing this initial transparency, the various data transforming operations that comprise transform 100 are set so as not to alter the primary metric version of the image.

A transparency of the "Color Chart without NSC" image is generated by the digital output recording device 36 after application of the current version of transform 100. This transparency is represented by step 102 in FIG. 3a and, to show continuity, by a dashed box in FIG. 3b In step 104, the Color Chart transparency thus created is photographed onto the product film type using a conventional optical camera 42. The physical (original) Color Chart is also photographed onto the product film type in step 106. The second-generation photograph of the Color Chart transparency 104 and the first-generation photograph of the physical (original) Color Chart 106 are both developed, at the same time, in film processor 46, as shown in steps 108 and 110. In steps 112 and 114 the resulting densities of the patches within these photographs are measured. These density measurements are provided to decision step 116. A decision is made in decision step 116 to determine if the measured densities of the patches on the photographs agree to within predetermined limits. If they do not agree, one or more of the components of transform 100 may be modified, in step 118, and steps 100-116 are reiterated. If the densities of the photographs do agree, an acceptable target metric has been achieved for the digitally-generated transparency. The achievement of the proper transform 100, whose application yields an acceptable secondary target digital image data metric is represented in step 120.

The target metric, to which the primary metric version of the scene is transformed, results in a second-generation camera-original photograph on the product film type of the digitally-generated transparency of the scene which has the same tone and color characteristics as a first-generation camera-original photograph exposed on the same product film type at the original live scene.

A second embodiment of Stage II of the present invention provides for an alternative method and means for generating data sets from which to derive digital data transform 100 which converts imaging data in a primary image data metric into a secondary target image data metric such that when the target metric version of the image is output using an output film recording device onto a specified transparency film, and the resulting developed transparency is backlit and photographed by a conventional camera, the frequency response, tone and color characteristics of the resulting second-generation camera-original photograph are indistinguishable from those characteristics of a first-generation camera-original photograph exposed onto the same product film type.

FIG. 3c illustrates diagrammatically the process for developing transform 100 via this alternate embodiment. Exposure patterns, chosen to adequately sample the useful exposure range of the transparency film to be used, are created using an exposing pattern generator 200 and are provided as input to an exposing apparatus 210. The exposing apparatus 210 produces known exposures, which may be trichromatic in nature, on the transparency film, creating a test image 220 consisting of approximately 400 color patches. It would be preferable if the test image 220 were produced using the same film output recording device 36 that will later be used to digitally generate the "Shirley without NSC" transparency that is to be processed, backlit and photographed to create second-generation camera-original control tool photographs. In such case, the exposure patterns may correspond to digital code patterns which, when provided as input to the exposing apparatus 210, in turn produce exposures on the transparency film. The exposures of corresponding digital codes can be considered to be in the target metric. The exposed color patch test image transparency is developed in the conventional manner.

The developed color patch test image transparency is backlit, preferably using the backlighting system 40 to be later used in the production of second-generation camera-original control tool photographs, and is photographed onto the product film type, again, preferably using the conventional camera 42 to be later used in the production of second-generation camera-original control tool photographs. The film would preferably be of the same emulsion as that to be later used in the production of second-generation camera-original control tool photographs. This photograph of the backlit color patch test image transparency is developed in the conventional manner.

The developed photograph 230 of the backlit color patch test image transparency 220 is scanned by a transmission scanner 240 which produces image-bearing signals corresponding to each color patch. The scanner used would preferably be the same digital film scanner 30 used to photodigitize first-generation camera-original photographs. In that case the scanner image-bearing signals can be considered to be in the primary digital image data metric.

Transform apparatus 250 creates a transform 260 relating the primary metric data for the color patches formed on the photograph 230, onto product film, of the backlit color patch test image transparency to the target metric data for the color patches of the color patch test image transparency itself. The transform 260 may consist of a series of operations which may include, but would not be limited to, one-dimensional look-up-tables, multi-dimensional look-up-tables, matrix operators and/or other digital data transforming operations. Where the image-bearing signals, generated by scanner 240, of the processed photograph 230 of the backlit color patch test image transparency are representative of the target metric, it may not be required to further transform the scanner data.

Once the correct digital data transform is determined, the process proceeds to Stage III.

Stage III of the process, FIGS. 4a–c, relates to the application of transform 100 (from Stage II) to the primary digital image data metric versions of the "Color Chart without NSC" image 90 and the "Shirley without NSC" image (into which the control elements have been digitally inserted) 96 to form images in the target digital data metric for output as final product transparencies using the digital output recording device 36. Stage III also describes the final verification of the product transparencies 39 via the second-generation photography of those transparencies onto the product film type.

Digital images 90 and 96 (from Stage I) are shown again as dashed boxes to portray the linkage between Stage I and Stage III. These primary metric versions of the "Color Chart without NSC" image and the "Shirley without NSC" image are modified by transform 100 (derived in Stage II) in steps 130 and 132.

In steps 134 and 136, the target metric versions of the "Color Chart without NSC" and "Shirley without NSC" images are output as transparencies by the digital output recording device 36. The transparencies 37 are developed in the conventional manner in film processor 38. These developed transparencies 39 of the Color Chart and Shirley are then photographed with the conventional camera 42 onto the product film type 44 in steps 142 and 144 of FIG. 4b.

It will be noticed that, insofar as the Color Chart is concerned, the same steps taken during the derivation of the correct transform 100 in Stage II, are repeated within Stage III. This repetition is necessary for two reasons:

a) for the purpose of maintaining a steady state of calibration of the second-generation photographic system as a whole. By repeating, in Stage III, those operations that led to the derivation of transform 100 in Stage II, any deviation encountered, during Stage III, in one or more of the various conditions which resulted in the derivation of transform 100 may be tracked and their effect on the total system corrected or minimized.

b) since the "Shirley without NSC" image 96 does not, by design, contain an extensive number of patches that may be used to verify the accuracy of the final "Shirley without NSC" transparency, but rather, contains only those control elements specifically requested by the client, it becomes even more important to use, for verification purposes, the image of the Color Chart as a measurable "companion" image, which undergoes all of the same digital and chemical processing as does the final product "Shirley without NSC" image.

The first-generation camera-original versification photograph of the live "Shirley" 70 that had been exposed onto the product film type at the original scene, and frozen in step 82, is taken out of the freezer in step 138.

A first-generation camera-original photograph of the physical Color Chart is exposed onto the same product film type as is to be used for the creation of the final product second-generation control tool photographs of the "Shirley" transparency. This is shown in step 140.

All four photographs (140, 142, 144 and 138) are simultaneously developed in the film processor 46 as shown in steps 146–152 of FIG. 4b.

The densities of the patches within the developed second-generation photograph of the Color Chart transparency 148 and the densities of the patches contained within the developed first-generation photograph of the physical (original) Color Chart 146 are measured in steps 154 and 156. The measured densities are compared in decision step 158.

If the density data in steps 154 and 156 do not match, within predescribed limits, as decided in decision step 158, the cause is identified and the procedure may be reiterated, back to Stage II if necessary, as shown in step 160.

As mentioned previously, the product film type on which the second-generation control tool photographs are produced may be either a positive or a negative film type. If the density data, steps 154 and 156, of the two Color Chart photographs sufficiently matches and the second-generation product film is a positive (or "reversal") film type, the digitally-generated transparency of the Color Chart has satisfied one criterion. A visual comparison of the first- and second-generation positive photographs of the Color Chart is performed in steps 162 and 164. If it is determined, in decision step 170, that, in addition to the density match, there is also a sufficient visual match between the first-generation positive photograph and the second-generation positive photograph, a second criterion is met and the digitally-generated Color Chart transparency may be deemed acceptable for that film type.

It has been stated previously that, by design, the digitally-generated transparency of the Shirley image itself does not contain an extensive number of measurable patches that can be used to verify the accuracy of the transparency.

As stated previously, since the Shirley transparency undergoes all of the same digital and chemical processing as does the digitally-generated Color Chart transparency, once the transparency of the Color Chart is deemed acceptable, the Shirley transparency is deemed acceptable as well. Additional confidence in the acceptability of the Shirley transparency may be gained by visually comparing, in steps 166 and 168, the developed second-generation positive photograph of the Shirley 150 to the developed first-generation verification positive photograph 152. If it is determined, in decision step 176, that there is a sufficient Visual match between the two Shirley positive photographs, additional confidence is gained in terms of the digitally-generated Shirley transparency being acceptable for that product film type.

If the density data, steps 154 and 156, of the two Color Chart photographs match and the second-generation product film is a negative film type, the digitally-generated transparency of the Color Chart satisfies one criterion.

The developed second-generation camera-original negative 148, resulting from the photography of the digitally-generated Color Chart transparency on the product file type and the developed first-generation camera-original negative 146 resulting from the photography of the physical (original) Color Chart on the product film type are printed onto photographic paper in steps 162 and 164. The densities of the patches for each of the two photographic prints are also measured in steps 162 and 164.

If the density data from the prints in steps 162 and 164 do match, the digitally-generated transparency 39 has satisfied a second criterion. Lastly, the prints in steps 162 and 164 may be compared visually. If there is a sufficient visual match, the transparency 39 has satisfied all of the criteria and is considered acceptable for that particular product film type.

If the density data from the prints in step 162 and 164 do not match sufficiently, or if there is not a sufficient visual match between the two prints (decision step 170), the cause is identified and the process is reiterated, beginning with the appropriate step, all the way back to step 118 of Stage II, if necessary, as portrayed in step 174.

Further verification may be achieved by printing, onto photographic paper, the developed second-generation negative of the Shirley on the product film type 150 and the developed first-generation verification negative of the Shirley on the product film type 152. This printing is shown in steps 166 and 168. If there is a sufficient visual match between these two prints, (decision step 176), the digitally-generated "Shirley without NSC" transparency is deemed acceptable for that product film type.

Once the digitally-generated "Shirley without NSC" transparency (into which the desired control elements had been digitally inserted) has been deemed acceptable for a particular product film type, that transparency is provided to the client for the mass production of second-generation camera-original control tool photographs onto that particular product film type. The control tools are produced by backlighting and photographing the digitally-generated transparency on the same system that was characterized and used in the calibration of the transparency.

Developing the photographs of the backlit, calibrated transparency produces second-generation camera-original photographs on the product film type whose frequency response, tone and color characteristics are indistinguishable from those of a first generation camera-original photograph exposed onto the same product film type at the original live scene.

With respect to the decision steps 116, 158, 170 and 176, the degree to which exact matches are required is governed by the criteria specified by the client.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of predictably producing, via digital techniques, accurate photoprocessing control tool photographs to be used for adjusting the parameters of a photographic device comprising the steps of:
   a. photographing a first image of a scene containing preselected background and subject content onto a first photographic recording medium;
   b. photographing a second image of photoprocessing parameter control information onto a second photographic recording medium;
   c. photodigitizing said first image into a first digitized image, and said second image into a second digitized image, which are stored in a primary digital image data metric in a digital image data base;
   d. digitally inserting a photoprocessing control image into the first digitized image to produce a composite digital image;
   e. selectively transforming one or more parameters of said composite image;
   f. digitally recording said composite digital image onto a photographic recording medium, using a digital output recording device;
   g. photographing the composite image that has been recorded on the photographic recording medium in step (f); and
   h. developing the photograph of the composite image obtained in step (g) to provide said photoprocessing control tool photograph.

2. A method according to claim 1, wherein said second photographic recording medium is one having the same image recording characteristics as said first photographic recording medium.

3. A method according to claim 2, wherein step (b) comprises photographing a second image of at least one calibration chart on said second photographic recording medium.

4. A method according to claim 2, wherein step (b) comprises photographing a second image of sensitometric information onto said second photographic recording medium.

5. A method according to claim 2, wherein step (b) comprises the steps of:
  (b1) photographing a second image of at least one calibration scene on said second photographic recording medium, and
  (b2) photographing a third image of sensitometric information on a third photographic recording medium having the same image recording characteristics as said first photographic recording medium; and wherein
  step (e) comprises selectively adjusting one or more parameters of said first digitized image in accordance with information contained in said second and third images.

6. A method according to claim 5, wherein step (e) further comprises the step of (e2) transforming the digital image data metric of the first image as transformed in step (e1) in accordance with information contained in said second and third images.

7. A method according to claim 6, wherein step (e2) comprises selectivley transforming the digital image data metric of said first image such that the photograph of said first image obtained in step (g) has the same tone scale and color characteristics as the image photographed onto said first recording medium.

8. A method according to claim 2, wherein step (e) comprises selectively transforming one or more parameters of said first digitized image in accordance with information contained with said second digitized image.

9. A method according to claim 1, wherein step (e) further comprises the steps of:
  (e1) specificity exposure patterns which sample the exposure range of a photographic recording medium;
  (e2) forming test images comprising arrays of color patches on the photographic recording medium wherein the color patches are formed using exposure patterns specified in step (e1);
  (e3) forming digital image-bearing signals of said test images;
  (e4) deriving transformations relating said digital image-bearing signals to the primary digital image data metric of step (c); and
  (e5) selectively transforming the composite digital image step (d) using the transformations developed in step (e4).

10. A method of predictably producing, via digital techniques, accurate photoprocessing control tool photographs to be used for adjusting the parameters of a photographic device comprising the steps of:
  a. photographing a first image of a scene containing preselected background and subject content onto a first photographic recording medium;
  b. photodigitizing said first image into a first digitized image, which is stored in a primary digital image data metric in a digital image data base;
  c. selectively transforming one or more parameters of said first digitized image;
  d. digitally recording said first digitized image onto a photographic recording medium, using a digital output recording device;
  e. photographing the first digitized image that has been recorded on the photographic recording medium in step (d); and
  f. developing the photograph of the first digitized image obtained in step (e) to provide said photoprocessing control tool photograph.

11. A method according to claim 1, wherein step (c) further comprises the steps of:
  (c1) specifying exposure patterns which sample the exposure range of a photographic recording medium;
  (c2) forming test images comprising arrays of color patches on the photographic recording medium wherein the color patches are formed using exposure patterns specified in step (c1);
  (c3) forming digital image-bearing signals of said test images;
  (c4) deriving transformations relating said digital image-bearing signals to the primary digital image data metric of step (b); and
  (c5) selectively transforming the first digitized digital image using the transformation developed in step (c4).

12. A method of producing second-generation camera-original photographs comprising:
  (a) photographing an image of a color chart of known spectral reflectance values onto a first photographic recording medium and photodigitizing the image of the color chart into a first digitized image;
  (b) photographing an image of a preselected scene onto a second photographic recording medium and photodigitizng the image of the preselected scene into a second digitized image;
  (c) photographing an image containing both a color chart of known spectral reflectance values and a neutral scale chart of known spectral reflectance values onto a third photographic recording medium and photodigitizng that image into a third digitized image;
  (d) photographing an image of the preselected scene including the neutral scale chart onto a fourth photographic recording medium and photodigitizing that image into a fourth digitized image;
  (e) creating a sensitometric exposure of known exposure values onto a fifth photographic recording medium and photodigitizing that exposure into a fifth digitized image;
  (f) storing the first, second, third, fourth and fifth images onto a digital image database;
  (g) deriving a digital data transform using the third, fourth and fifth digitized images;
  (h) applying the digital data transform to the first and second images to convert the first and second digitized images from a primary digital image data metric to a secondary, target digital image data metric required of the digital output recording device;
  (i) recording the second digitized image, after it has been converted to the target digital image data metric required of the digital output recording device, onto a first output recording medium; and
  (j) photographing the second digitized image that has been recorded onto the first output recording medium and developing the photograph of the second digitized image that has been recorded onto the first output recording medium to provide said second-generation camera-original photograph.

13. The method of claim 12, wherein the first output recording medium is a photographic transparency and said step (j) includes backlighting the transparency and photographing said transparency.

14. The method of claim 12, further comprising the steps of:

(k) applying the digital data transform to convert the primary digital image data metric of the first digitized image to the secondary, target digital image data metric required of the digital output recording device;

(l) recording the first digitized image to which the digital data transform has been applied onto a second output recording medium;

(m) photographing the image of the color chart onto a sixth photographic recording medium;

(n) developing and comparing the photograph of the first digitized image, recorded on the second output recording medium, and the photograph of the physical color chart, recorded onto the sixth photographic recording medium, to determine the correctness of the digital data transform; and (o) modifying the digital data transform if the comparison performed in step (n) determines the digital data transform is not correct, and applying the digital data transform to the second digitized image only after the transform is determined to be correct.

15. The method of claim 12, further comprising the steps of:

(p) photographing the image of the preselected scene onto a second output recording medium;

(q) developing the image recorded onto the second output recording medium and comparing the photograph of the preselected scene, recorded onto the second output recording medium, to the developed second-generation camera-original photograph to verify the correctness of the preceding steps.

* * * * *